US008725702B1

(12) United States Patent
Raman et al.

(10) Patent No.: US 8,725,702 B1
(45) Date of Patent: May 13, 2014

(54) SYSTEMS AND METHODS FOR REPAIRING SYSTEM FILES

(75) Inventors: Nivedhitha Raman, Santa Monica, CA (US); David Kane, Los Angeles, CA (US); Sonia Subramanian, Marina Del Rey, CA (US); Wilson Meng, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 12 days.

(21) Appl. No.: 13/420,799

(22) Filed: Mar. 15, 2012

(51) Int. Cl.
*G06F 7/00* (2006.01)
*G06F 17/00* (2006.01)
*G06F 17/30* (2006.01)

(52) U.S. Cl.
USPC .......................... 707/691; 707/697; 707/736

(58) Field of Classification Search
USPC .......... 707/202, 639; 709/226; 714/38.1, 769, 714/6.24, 3; 701/33; 717/173; 726/26
See application file for complete search history.

(56) References Cited

U.S. PATENT DOCUMENTS

| | | | |
|---|---|---|---|
| 6,449,731 B1 * | 9/2002 | Frey, Jr. ....................... | 714/6.24 |
| 6,728,922 B1 * | 4/2004 | Sundaram et al. ............ | 714/769 |
| 8,464,351 B2 * | 6/2013 | Maximilien et al. ............ | 726/26 |
| 2006/0129614 A1 * | 6/2006 | Kim et al. ...................... | 707/202 |
| 2009/0326758 A1 * | 12/2009 | Ramanathan et al. .......... | 701/33 |
| 2011/0276695 A1 * | 11/2011 | Maldaner ....................... | 709/226 |
| 2012/0042195 A1 * | 2/2012 | Marinelli et al. ................. | 714/3 |
| 2012/0079325 A1 * | 3/2012 | Riegel et al. ................. | 714/38.1 |
| 2012/0144383 A1 * | 6/2012 | Mishra et al. ................. | 717/173 |
| 2012/0233123 A1 * | 9/2012 | Shisheng et al. .............. | 707/639 |

* cited by examiner

*Primary Examiner* — Susan Chen
(74) *Attorney, Agent, or Firm* — ALG Intellectual Property, LLC

(57) ABSTRACT

A computer-implemented method for repairing system files may include 1) identifying a request to repair a corrupted system file in an operating system, 2) receiving file metadata describing the corrupted system file and system metadata describing the operating system, 3) identifying an uncorrupted version of the corrupted system file by i) identifying a series of matching tests for matching the corrupted system file with the uncorrupted version, the series of matching tests including at least one file metadata item from the file metadata and at least one system metadata item from the system metadata, and ii) applying the series of matching tests in a predetermined order to a database of uncorrupted system files until a matching test matches the corrupted system file with the uncorrupted version of the system file. Various other methods, systems, and computer-readable media are also disclosed.

20 Claims, 6 Drawing Sheets

SYSTEMS AND METHODS FOR REPAIRING SYSTEM FILES

BACKGROUND

Consumers and businesses face a growing tide of malicious software that threatens the stability and performance of their computers and the security of their data. Computer programmers with malicious motivations have created and continue to create viruses, Trojan horses, worms and other programs in an attempt to compromise computer systems. These malicious programs are often referred to as malware. In an attempt to evade detection and removal, some exploits may inject malware into malicious programmers may even inject malware into system files.

Traditional anti-malware systems may attempt to repair system files by identifying malware injected into the system files and removing the malware while leaving the remainder of the system files intact. Unfortunately, traditional anti-malware systems may not always correctly repair infected system files. For example, traditional anti-malware systems may leave illegitimate portions of infected system files intact and/or remove legitimate portions of infected system files. In some cases, traditional anti-malware systems may determine that infected system files cannot be repaired. Furthermore, polymorphic malware may increase the difficulty of isolating and removing malware from infected system files. Accordingly, the instant disclosure identifies and addresses a need for additional and improved systems and methods for repairing system files.

SUMMARY

As will be described in greater detail below, the instant disclosure generally relates to systems and methods for repairing system files by using a series of matching tests to match the file metadata and system metadata of corrupted system files with correct versions of clean system files (and, e.g., replacing and/or repairing the corrupted system files with the clean system files). In one example, a computer-implemented method for repairing system files may include 1) identifying a request to repair a corrupted system file in an operating system, 2) receiving file metadata describing the corrupted system file and system metadata describing the operating system, 3) identifying an uncorrupted version of the corrupted system file by i) identifying a series of matching tests for matching the corrupted system file with the uncorrupted version, the series of matching tests including at least one file metadata item from the file metadata and at least one system metadata item from the system metadata, and ii) applying the series of matching tests in a predetermined order to a database of uncorrupted system files until a matching test matches the corrupted system file with the uncorrupted version of the system file.

In some examples, receiving the file metadata may include receiving the corrupted system file and parsing a portable executable header of the corrupted system file for the file metadata. In some embodiments, the computer-implemented method may also include repairing the corrupted system file with the uncorrupted version of the system file. In these embodiments, repairing the corrupted system file with the uncorrupted version of the system file may include 1) identifying at least one difference between the corrupted system file and the uncorrupted system file and 2) replacing the difference in the corrupted system file with a corresponding portion of the uncorrupted system file.

In one example, the series of matching tests may include a matching test comparing the corrupted system file and each prospective match within the database of uncorrupted system files by comparing at least 1) a checksum of the corrupted system file and a checksum of the prospective match, 2) an operating system version of the operating system and an operating system version of the prospective match, and 3) a file name of the corrupted system file and a file name of the prospective match. In one embodiment, the series of matching tests may include a matching test comparing the corrupted system file and each prospective match within the database of uncorrupted system files by comparing at least 1) a file architecture of the corrupted system file and a file architecture of the prospective match and 2) a file name of the corrupted system file and a file name of the prospective match.

In some embodiments, the series of matching tests may include a matching test comparing the corrupted system file and each prospective match within the database of uncorrupted system files by comparing at least 1) a product name of the corrupted system file and a product name of the prospective match, 2) a product version of the corrupted system file and a product version of the prospective match, 3) a file architecture of the corrupted system file and a file architecture of the prospective match, and 4) a file name of the corrupted system file and a file name of the prospective match. In some examples, the series of matching tests may include a matching test comparing the corrupted system file and each prospective match within the database of uncorrupted system files by comparing at least 1) a service pack of the operating system and a service pack of the operating system version of the prospective match, 2) a hotfix of the operating system and a hotfix of the operating system version of the prospective match, 3) an architecture of the operating system and an architecture of the operating system version of the prospective match, and 4) a file name of the corrupted system file and a file name of the prospective match.

In one embodiment, a system for implementing the above-described method may include 1) an identification module programmed to identify a request to repair a corrupted system file in an operating system, 2) a receiving module programmed to receive file metadata describing the corrupted system file and system metadata describing the operating system, and 3) a matching module programmed to identify an uncorrupted version of the corrupted system file by i) identifying a series of matching tests for matching the corrupted system file with the uncorrupted version, the series of matching tests including at least one file metadata item from the file metadata and at least one system metadata item from the system metadata and ii) applying the series of matching tests in a predetermined order to a database of uncorrupted system files until a matching test matches the corrupted system file with the uncorrupted version of the system file. The system may also include at least one processor configured to execute the identification module, the receiving module, and the matching module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a request to repair a corrupted system file in an operating system, 2) receive file metadata describing the corrupted system file and system metadata describing the operating system, 3) identify an uncorrupted version of the corrupted system file by i) identifying a series of matching tests for matching the corrupted system file with the uncorrupted version, the series of matching tests including at least one file metadata item from the file metadata and at least one system metadata item from the system metadata, and ii) applying the series of matching tests in a predetermined order to a database of uncorrupted system files until a matching test matches the corrupted system file with the uncorrupted version of the system file.

As will be explained in greater detail below, by using series of matching tests to match the file metadata and system metadata of corrupted system files with correct versions of clean system files (and, e.g., replacing and/or repairing the corrupted system files with the clean system files), the systems and methods described herein may fully and correctly repair system files, even where malware within infected system files is not identified and/or isolated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
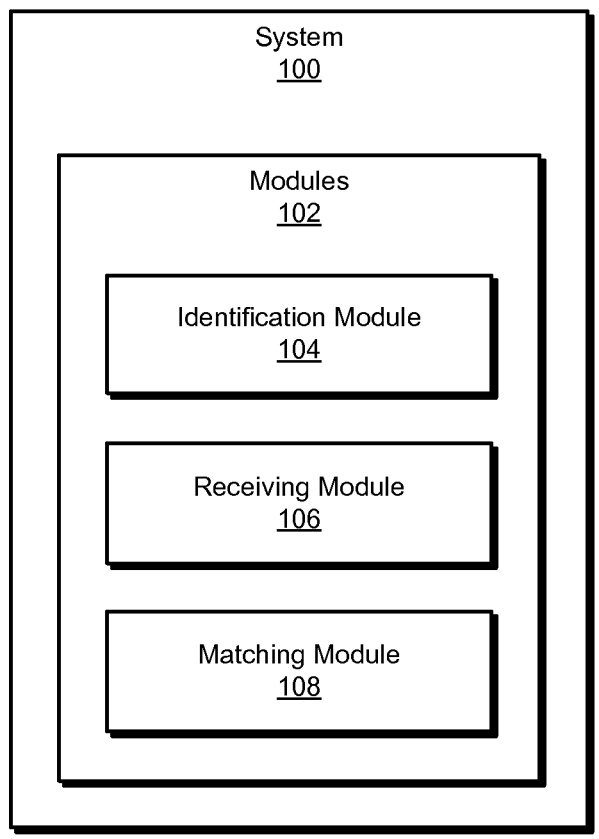
FIG. 1 is a block diagram of an exemplary system for repairing system files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
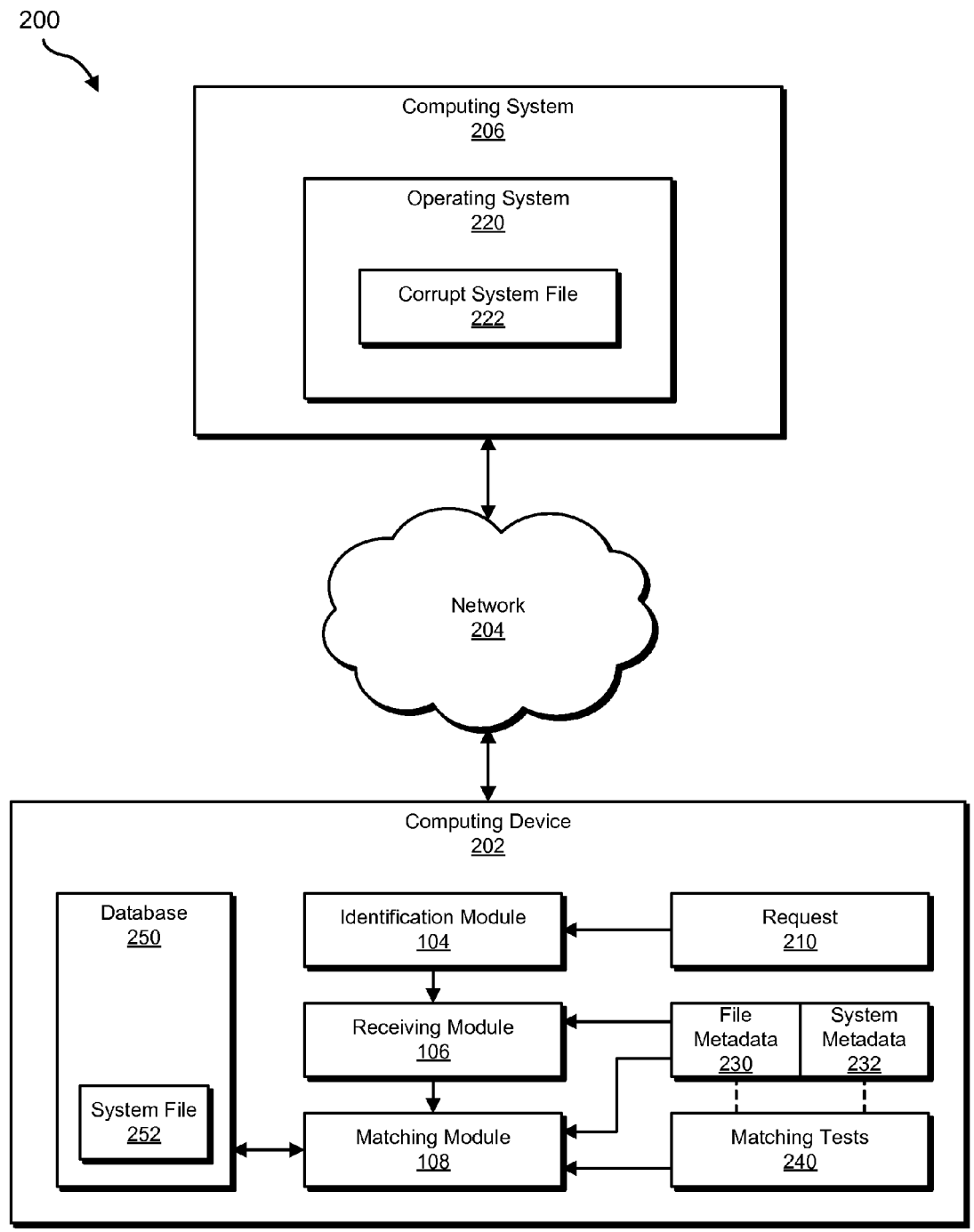
FIG. 2 is a block diagram of an exemplary system for repairing system files.
Figure 3:
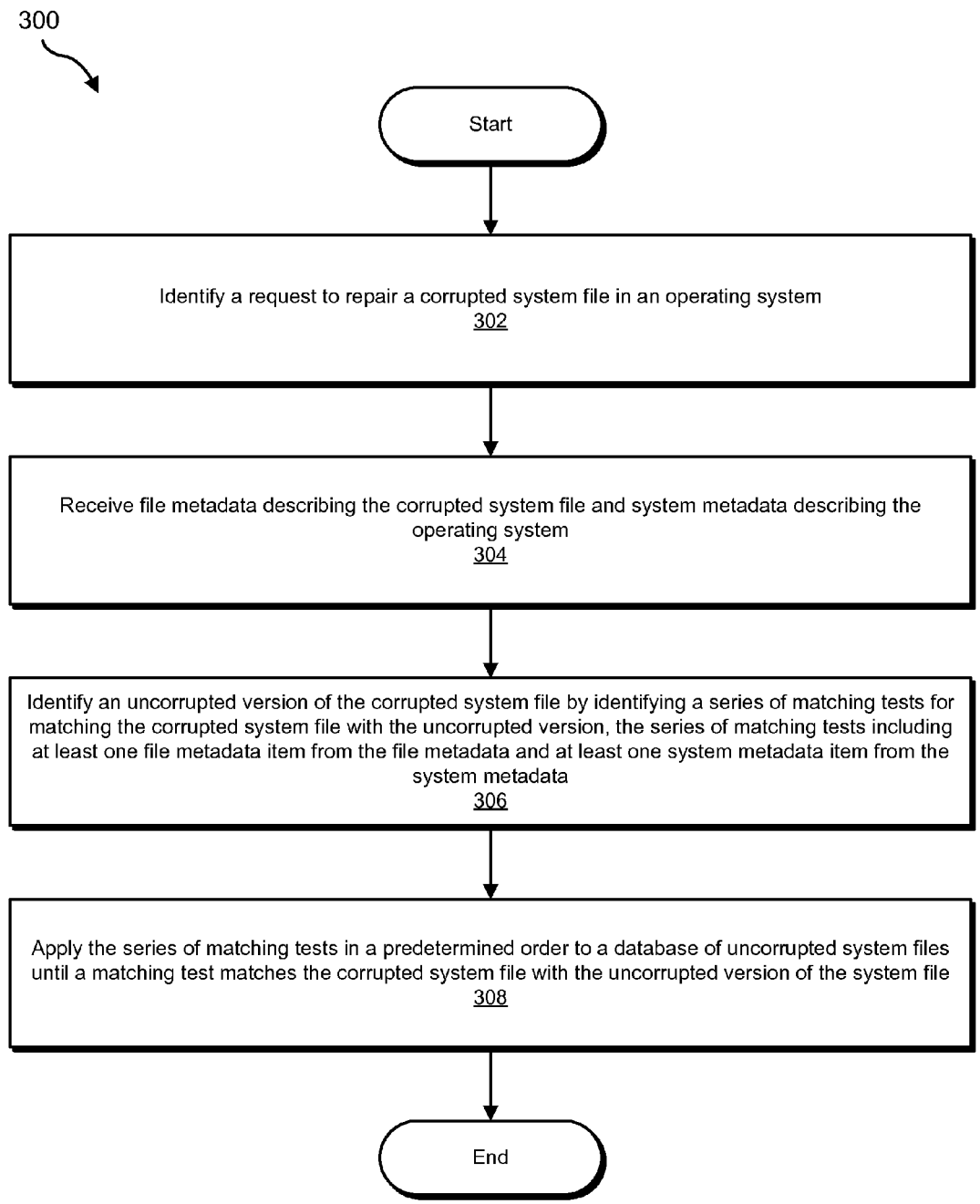
FIG. 3 is a flow diagram of an exemplary method for repairing system files.
Figure 4:
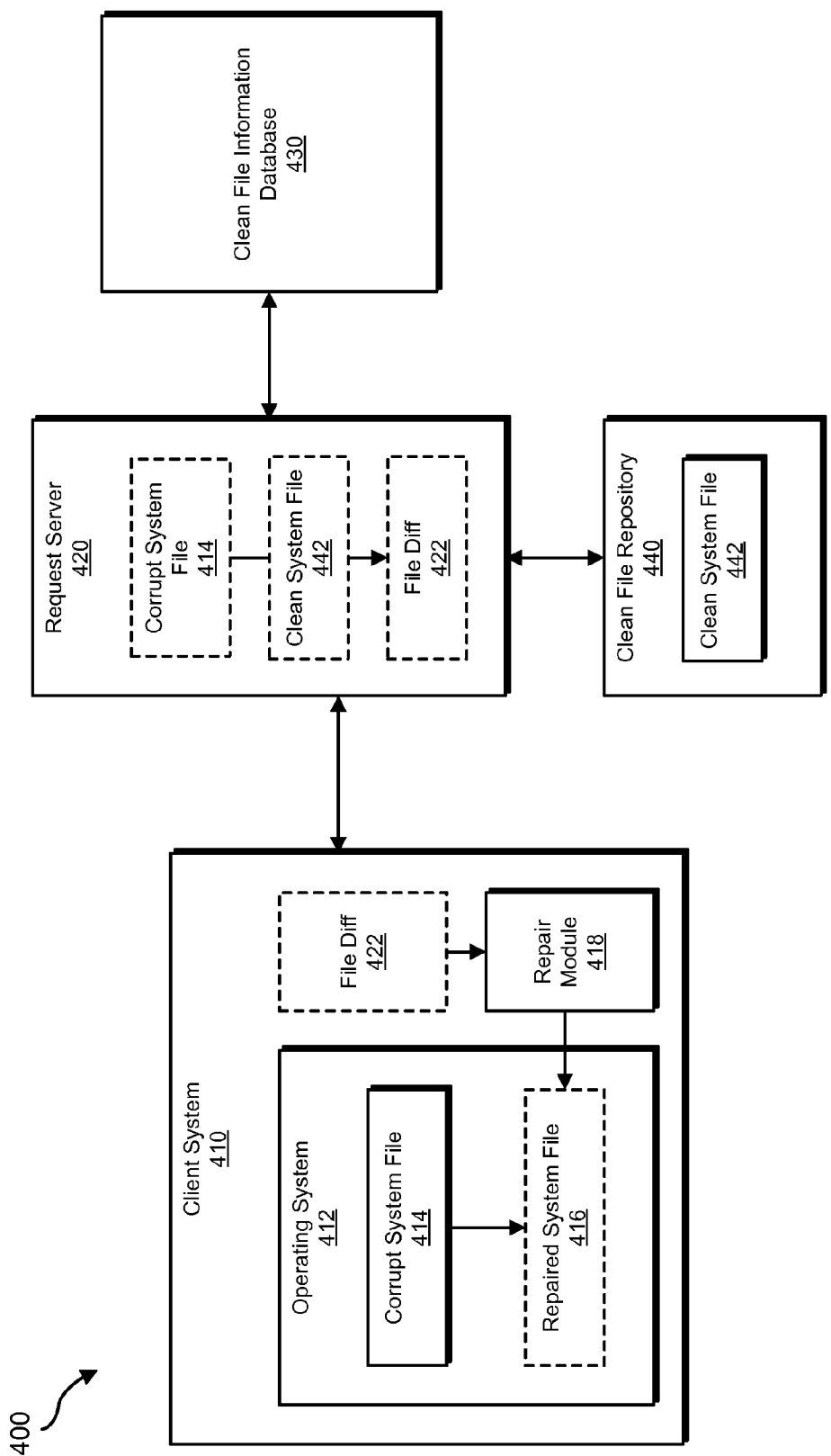
FIG. 4 is a block diagram of an exemplary system for repairing system files.

The following will provide, with reference to FIGS. 1, 2, and 4, detailed descriptions of exemplary systems for repairing system files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for repairing system files. As illustrated in this figure, exemplary system 100 may include one or more modules 102 for performing one or more tasks. For example, and as will be explained in greater detail below, exemplary system 100 may include an identification module 104 programmed to identify a request to repair a corrupted system file in an operating system. Exemplary system 100 may also include a receiving module 106 programmed to receive file metadata describing the corrupted system file and system metadata describing the operating system.

In addition, and as will be described in greater detail below, exemplary system 100 may include a matching module 108 programmed to identify an uncorrupted version of the corrupted system file by i) identifying a series of matching tests for matching the corrupted system file with the uncorrupted version, the series of matching tests including at least one file metadata item from the file metadata and at least one system metadata item from the system metadata and ii) applying the series of matching tests in a predetermined order to a database of uncorrupted system files until a matching test matches the corrupted system file with the uncorrupted version of the system file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing system 206 via a network 204 (e.g., to repair a corrupt system file 222 on computing system 206).

In one embodiment, one or more of modules 102 from FIG. 1 may, when executed by at least one processor of computing device 202, facilitate computing device 202 in repairing system files. For example, and as will be described in greater detail below, one or more of modules 102 may cause computing device 202 to 1) identify a request 210 to repair corrupt system file 222 in an operating system 220 (e.g., on computing system 206), 2) receive file metadata 230 describing corrupt system file 222 and system metadata 232 describing operating system 220, 3) identify an uncorrupted version of corrupt system file 222 (e.g., a system file 252) by i) identifying a series of matching tests 240 for matching corrupt system file 222 with system file 252, matching tests 240 including at least one file metadata item from file metadata 230 and at least one system metadata item from system metadata 230, and ii) applying matching tests 240 in a predetermined order to a database 250 of uncorrupted system files until a matching test matches corrupt system file 222 with system file 252.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Database 250 may represent portions of a single database or computing device or a plurality of databases or computing devices. For example, database 250 may represent a portion of computing device 202 in FIG. 2, computing system 510 in FIG. 5, and/or portions of exemplary network architecture 600 in FIG. 6. Alternatively, database 250 may represent one or more physically separate devices capable of being accessed by a computing device, such as computing device 202 in FIG. 2, computing system 510 in FIG. 5, and/or portions of exemplary network architecture 600 in FIG. 6.

Computing system 206 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for repairing system files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to repair a corrupted system file in an operating system. For example, at step 302 identification module 104 may, as part of computing device 202 in FIG. 2, identify request 210 to repair corrupt system file 222 in an operating system 220 (e.g., on computing system 206).

As used herein, the phrase "operating system" may refer to any collection of components that manages resources (such as CPU usage and/or I/O requests) associated with a computing device and/or facilitates communication between the computing device's hardware and software. Accordingly, the operating system may include any of a variety of system software, including operating system kernels, device drivers, utility software, interface software (e.g., window mangers), and the like. As used herein, the phrase "system file" may refer to any file used by an operating system in the execution of the operating system. For example, the system file may include a device driver. In some examples, the phrase "system file" may refer to a file that is a part of and/or interfaces directly with an operating system kernel to contribute to the operation of the operating system. Additionally or alternatively, the phrase "system file" may refer to a file that includes computer-executable instructions and/or that may include an exploit to generate computer-executable instructions, the contents of which may depend on the attributes of an operating system (e.g., the version of the operating system) in order to ensure that the operating system functions properly.

The corrupted system file may be corrupted in any of a variety of ways. For example, the corrupted system file may have been infected, damaged, and/or otherwise modified by malware. In some examples, the corrupted system file may have been modified by a system error, a user error, and/or a hardware failure. In some examples, the corrupted system file may not operate correctly. Additionally or alternatively, the corrupted system file may operate but also perform illegitimate operations (e.g., malware-directed operations). In some examples, the corrupted system file may operate correctly but may not meet a security standard (e.g., because the corrupted system file was modified and is no longer a trusted file). Accordingly, the request to repair the corrupted system file may arise in any of a variety of contexts. For example, the request to repair the corrupted file may arise from an anti-malware system that detected malware within the corrupted system file and/or a behavioral anomaly traced to the corrupted system file. Additionally or alternatively, the request to repair the corrupted system file may arise from an authentication system determining that the corrupted system file does not match any whitelisted system file (e.g., based on a fingerprint of the corrupted system file). In some examples, the request to repair the corrupted system file may include a user-submitted request.

Identification module 104 may identify the request in any suitable manner. For example, identification module 104 may receive a message from a client system including the request. As will be explained in greater detail below, in some examples, one or more of the systems described herein may receive the corrupted system file and/or metadata about the corrupted system file. In these examples, identification module 104 may identify the request simply by receiving the corrupted system file and/or the metadata.

FIG. 4 illustrates an exemplary system 400 for repairing corrupted system files. As shown in FIG. 4, exemplary system 400 may include a client system 410, a request server 420, a clean file information database 430, and a clean file repository 440. Using FIG. 4 as an example, at step 302 identification module 104 may, as a part of request server 420, identify a request (e.g., received from client system 410) to repair a corrupt system file 414 within an operating system 412 of client system 410.

Returning to FIG. 3, at step 304 one or more of the systems described herein may receive file metadata describing the corrupted system file and system metadata describing the operating system. For example, at step 304 receiving module 106 may, as part of computing device 202 in FIG. 2, receive file metadata 230 describing corrupt system file 222 and system metadata 232 describing operating system 220.

As used herein, the phrase "file metadata" may refer to any attribute and/or characteristic of a file. In some examples, the file metadata may include metadata stored within the corrupted system file (e.g., in a designated metadata field). Additionally or alternatively, the file metadata may include metadata managed by a system outside of the corrupted system file (e.g., file system metadata managed by a file system in which the corrupted system file is stored). In some examples, the file metadata may include characteristics that may be derived and/or extracted from the corrupted system file upon analysis of the corrupted system file. Examples of file metadata include, without limitation, a file name, a file path, a file architecture, a checksum, a product name, a product version, a vendor name, a language, and the like.

As used herein, the phrase "system metadata" may refer to any attribute and/or characteristic of an operating system. Examples of system metadata include, without limitation, an operating system version, a service pack identifier, a hotfix identifier, an operating system architecture, an operating system language, and the like.

As mentioned earlier, receiving module 106 may receive the file metadata in any of a variety of ways. For example, receiving module 106 may receive a collection of metadata fields describing the corrupted system file. Additionally or alternatively, receiving module 106 may receive the system file and extract metadata fields from the corrupted system file. In some examples, receiving module 106 may receive the system file and analyze the system file to derive file metadata. In some examples, upon receiving the corrupted system file, receiving module 106 may parse a portable executable header of the corrupted system file for the metadata. As used herein, the phrase "portable executable header" may refer to any section of an executable file, object file, and/or library file including metadata about the file. For example, the phrase "portable executable header" may refer to a header of a Portable Executable file.

Using FIG. 4 as an example, at step 304 receiving module 106 may receive corrupt system file 414 and system metadata describing operating system 412 from client system 410. Receiving module 106 may also extract file metadata from corrupt system file 414.

Returning to FIG. 3, at step 306 one or more of the systems described herein may identify an uncorrupted version of the corrupted system file by, in part, identifying a series of matching tests for matching the corrupted system file with the uncorrupted version, the series of matching tests including at least one file metadata item from the file metadata and at least one system metadata item from the system metadata. For example, at step 306 matching module 108 may, as part of computing device 202 in FIG. 2, identify an uncorrupted version of corrupt system file 222 (e.g., system file 252) by, in part, identifying matching tests 240 for matching corrupt system file 222 with system file 252, matching tests 240 including at least one file metadata item from file metadata 230 and at least one system metadata item from system metadata 230.

The series of matching tests may include any tests for comparing the file metadata and/or system metadata corresponding to the corrupted system file and the operating system of the corrupted system file with one or more clean system files (and, e.g., the operating systems to which the clean system files correspond). The series of matching tests may include tests of any format and/or procedure. For example, the series of matching tests may include database queries for clean system files that match each file metadata item and system metadata item corresponding to the corrupted system file that are specified by the matching test. For example, each matching test may include a combination of file metadata items and system metadata items to match.

The matching tests may include any of a variety of combinations of metadata fields to match. For example, the series of matching tests may include a matching test comparing the corrupted system file and each prospective match within the database of uncorrupted system files by comparing at least 1) a checksum of the corrupted system file and a checksum of the prospective match, 2) an operating system version of the operating system and an operating system version of the prospective match, and 3) a file name of the corrupted system file and a file name of the prospective match. As used herein, the term "checksum" may refer to any checksum, fingerprint, hash, and/or other unique representation of a string of data. For example, the checksum may include a MD5 hash value. Additionally or alternatively, the checksum may include a SHA-256 hash value. The checksum may include any checksum generated before the corrupted system file was corrupted. For example, the checksum may include a checksum generated by a compiler and/or linker at the original time of compilation of the corrupted system file. The operating system version may include any information identifying the version of the operating system. For example, the operating system version may include a major operating system version and/or minor operating system version.

In one embodiment, the series of matching tests may include a matching test comparing the corrupted system file and each prospective match within the database of uncorrupted system files by comparing at least 1) a file architecture of the corrupted system file and a file architecture of the prospective match and 2) a file name of the corrupted system file and a file name of the prospective match. In some examples, the matching test may also include language-based file version information and a language of the file (e.g., as identified in a header of the file). Additionally or alternatively, the matching test may include language-independent file version information. The file architecture may include any information relating to the instruction set architecture for which the corrupted system file is configured.

In some examples, the series of matching tests may include a matching test comparing the corrupted system file and each prospective match within the database of uncorrupted system files by comparing at least 1) a product name of the corrupted system file and a product name of the prospective match, 2) a product version of the corrupted system file and a product version of the prospective match, 3) a file architecture of the corrupted system file and a file architecture of the prospective match, and 4) a file name of the corrupted system file and a file name of the prospective match. The product name may include any name and/or identifier by which the system file may be known (e.g., beyond a file system name). For example, the product name may include a name chosen by a vendor to represent the system file. Likewise, the product version may include a version identifier designated by a vendor for the current version of the system file.

In some examples, the series of matching tests may include a matching test comparing the corrupted system file and each prospective match within the database of uncorrupted system files by comparing at least 1) a service pack of the operating system and a service pack of the operating system version of the prospective match, 2) a hotfix of the operating system and a hotfix of the operating system version of the prospective match, 3) an architecture of the operating system and an architecture of the operating system version of the prospective match, and 4) a file name of the corrupted system file and a file name of the prospective match. The service pack metadata may include any information about any revision, update, fix, and/or enhancement to an operating system. In some examples, matching module 108 may match incremental service packs with corresponding cumulative service packs. The hotfix metadata may include any information about one or more patches applied to an operating system (e.g. to fix specific bugs in the operating system). The metadata identifying the architecture of the operating system may identify any information relating to an instruction set architecture for which the operating system is configured.

Matching module 108 may identify the series of matching tests in any suitable manner. For example, matching module 108 may identify the series of matching tests by reading a configuration file specifying the series of matching tests. Additionally or alternatively, matching module 108 may include one or more hard-coded matching tests. Accordingly, matching module 108 may identify the hard-coded matching tests by loading the matching tests.

Returning to FIG. 3, at step 308 one or more of the systems described herein may identify an uncorrupted version of the corrupted system file by, in part, identify an uncorrupted version of the corrupted system file by, in part, applying the series of matching tests in a predetermined order to a database of uncorrupted system files until a matching test matches the corrupted system file with the uncorrupted version of the system file. For example, at step 308 matching module 108 may, as part of computing device 202 in FIG. 2, identify an uncorrupted version of corrupt system file 222 (e.g., system file 252) by, in part, identify an uncorrupted version of corrupt system file 222 (e.g., a system file 252) by, in part, applying matching tests 240 in a predetermined order to database 250 of uncorrupted system files until a matching test matches corrupt system file 222 with system file 252.

As mentioned above, matching module 108 may apply the series of matching tests in a predetermined order until one of the matching tests results in a unique match. Accordingly, the matching tests may be arranged in an order from most precise and/or strict to least precise and/or strict. For example, earlier matching tests in the series may include more file metadata items while later matching tests in the series may include more system metadata items.

In one example, the matching module 108 may apply the following series of matching tests, in order: 1) testing for a match of the linker checksum of the corrupted system file, the file name of the corrupted system file, and the major and minor versions of the operating system, 2) testing for a match of language-based file version information of the corrupted system file, the language (e.g., localization) of the corrupted system file, the architecture of the corrupted system file and the file name of the corrupted system file, 3) testing for a match of language-independent file version information of the corrupted system file, the architecture of the corrupted system file, and the file name of the corrupted system file, 4) testing for a match of language-independent file version information of the corrupted system file, a neutral language (e.g., localization), and the architecture of the corrupted system file, 5) testing for a match of language-based product name information of the corrupted system file, language-based product version information of the corrupted system file, the architecture of the corrupted system file, the file name of the corrupted system file, the operating system service pack number of the operating system, and any operating system hotfixes applied to the operating system, and 6) testing for a match of the operating system major and minor versions, the service pack number of the operating system, any hotfixes applied to the operating system, an architecture of the operating system, a language of the operating system, and the name of the file.

Using FIG. 4 as an example, at step 308 matching module 108 may, as a part of request server 420, submit a series of queries to clean file information database 430 with metadata from corrupt system file 414 and operating system 412 until a unique matching clean system file is identified by clean file information database 430 (e.g., clean system file 442).

In some examples, one or more of the systems described herein may also repair the corrupted system file. For example, a repair module on the computing device of the operating system may repair the corrupted system module. The repair module may repair the corrupted system file in any suitable manner. For example, the repair module may repair the corrupted system file with the uncorrupted version of the system file identified by matching module 108. In some examples, the repair module may identify at least one difference between the corrupted system file and the uncorrupted version of the system file and then replace the difference in the corrupted system file with a corresponding portion of the uncorrupted system file. Additionally or alternatively, matching module 108 may simply replace the corrupted system file with the uncorrupted version of the system file.

Using FIG. 4 as an example, request server 420 may retrieve clean system file 442 from clean file repository, having identified clean system file 442 as the uncorrupted version of corrupt system file 414. Request server 420 may then generate a file diff 422 based on the difference between corrupt system file 414 and clean system file 442. Request server 420 may then respond to the request of client system 410 by providing file diff 422 to client system 410. A repair module 418 on client system 410 may then create a repaired system file 416 based on corrupt system file 414 and file diff 422.

As explained above, by using series of matching tests to match the file metadata and system metadata of corrupted system files with correct versions of clean system files (and, e.g., replacing and/or repairing the corrupted system files with the clean system files), the systems and methods described herein may fully and correctly repair system files, even where malware within infected system files is not identified and/or isolated.

Figure 5:
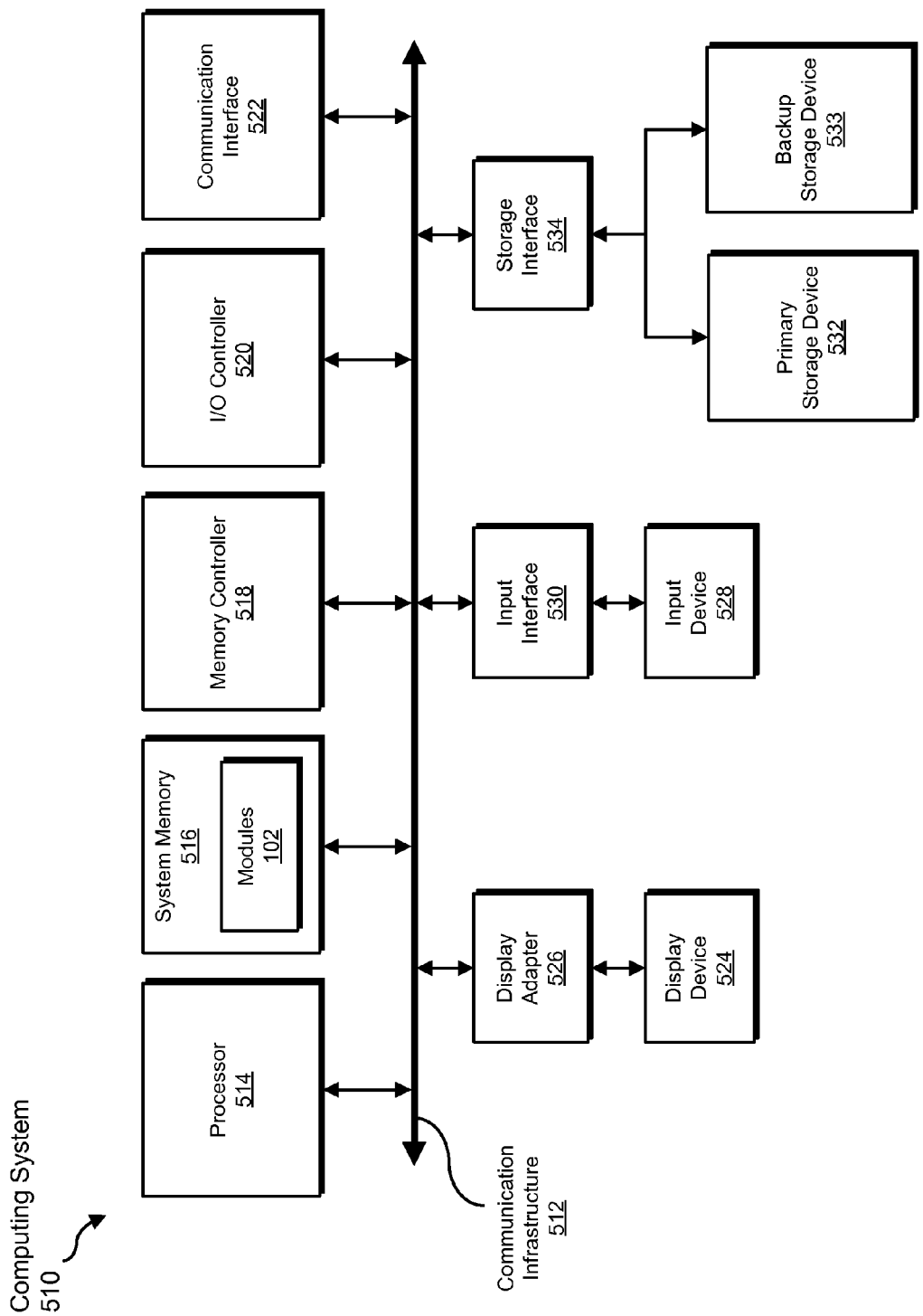
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, receiving, parsing, matching, applying, repairing, and replacing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
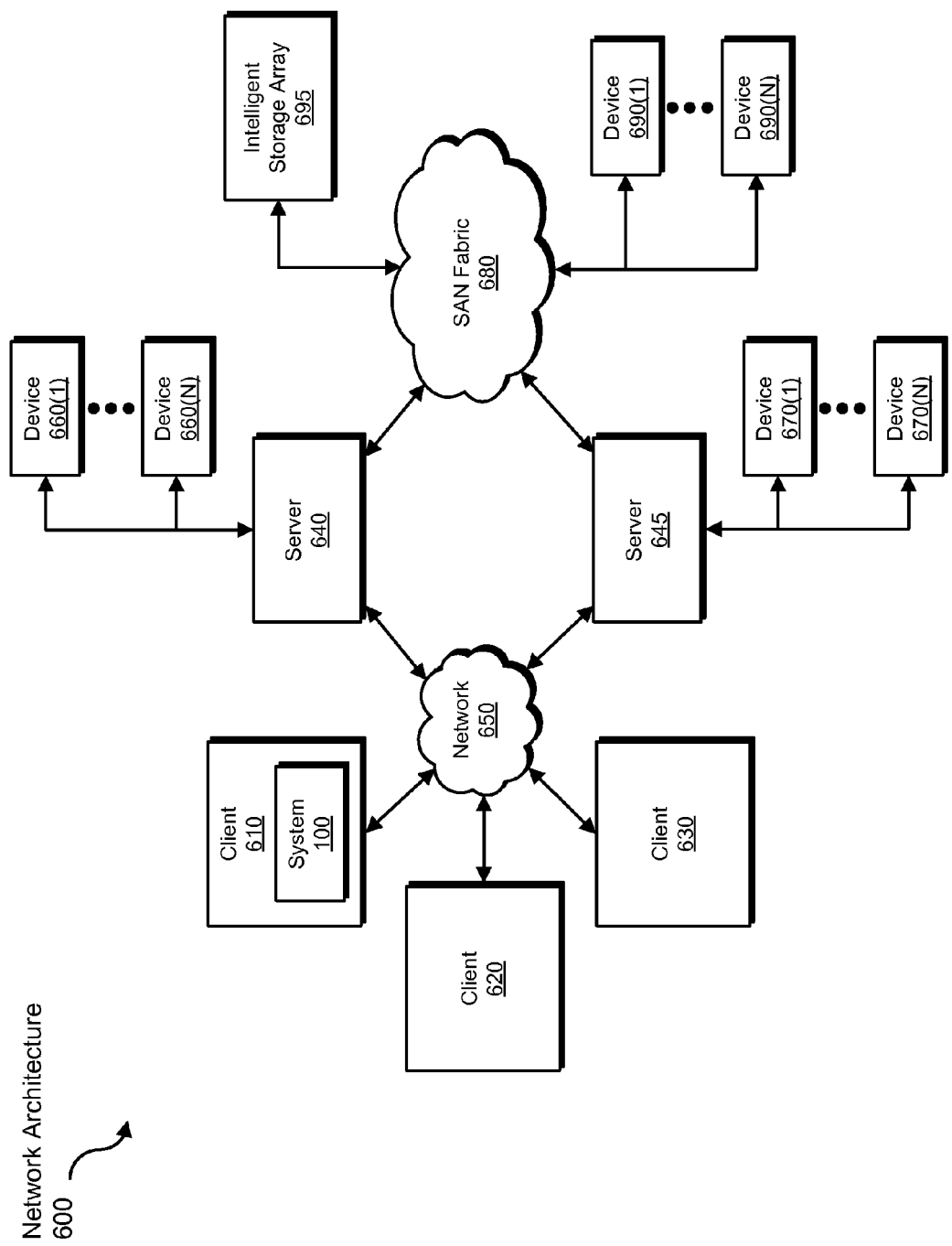
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, receiving, parsing, matching, applying, repairing, and replacing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for repairing system files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for repairing system files. As another example, one or more of the modules recited herein may transform a computing device into a device for identifying a clean version of a corrupted system file. As another example, one or more of the modules recited herein may transform a corrupted system file into a clean system file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for repairing system files, at least a portion of the method being performed by a computing device comprising at least one processor, the method comprising:
    identifying a request to repair a corrupted system file in an operating system;
    receiving file metadata describing the corrupted system file and system metadata describing the operating system;
    identifying an uncorrupted version of the corrupted system file by:
        identifying a series of matching tests for matching the corrupted system file with the uncorrupted version, the series of matching tests comprising at least one file metadata item from the file metadata and at least one system metadata item from the system metadata;
        applying the series of matching tests in a predetermined order to a database of uncorrupted system files until a matching test matches the corrupted system file with the uncorrupted version of the system file.

2. The computer-implemented method of claim 1, further comprising repairing the corrupted system file with the uncorrupted version of the system file, wherein the corrupted system file comprises a system file used by the operating system in execution of the operating system.

3. The computer-implemented method of claim 2, wherein repairing the corrupted system file with the uncorrupted version of the system file comprises:
    identifying at least one difference between the corrupted system file and the uncorrupted system file;
    replacing the difference in the corrupted system file with a corresponding portion of the uncorrupted system file.

4. The computer-implemented method of claim 1, wherein receiving the file metadata comprises:
    receiving the corrupted system file;
    parsing a portable executable header of the corrupted system file for the file metadata.

5. The computer-implemented method of claim 1, wherein the series of matching tests comprises a matching test comparing the corrupted system file and each prospective match within the database of uncorrupted system files by comparing at least:
    a checksum of the corrupted system file and a checksum of the prospective match;
    an operating system version of the operating system and an operating system version of the prospective match;
    a file name of the corrupted system file and a file name of the prospective match.

6. The computer-implemented method of claim 1, wherein the series of matching tests comprises a matching test comparing the corrupted system file and each prospective match within the database of uncorrupted system files by comparing at least:
    a file architecture of the corrupted system file and a file architecture of the prospective match;
    a file name of the corrupted system file and a file name of the prospective match.

7. The computer-implemented method of claim 1, wherein the series of matching tests comprises a matching test comparing the corrupted system file and each prospective match within the database of uncorrupted system files by comparing at least:
    a product name of the corrupted system file and a product name of the prospective match;
    a product version of the corrupted system file and a product version of the prospective match;
    a file architecture of the corrupted system file and a file architecture of the prospective match;
    a file name of the corrupted system file and a file name of the prospective match.

8. The computer-implemented method of claim 1, wherein:
    the corrupted system file comprises a file that is infected with malware;
    the computer-implemented method further comprises using the series of matching tests to repair the corrupted system file by identifying a difference between the corrupted system file and the uncorrupted version and replacing the difference in the corrupted system file with a corresponding portion of the uncorrupted version.

9. A system for repairing system files, the system comprising:
    an identification module programmed to identify a request to repair a corrupted system file in an operating system;
    a receiving module programmed to receive file metadata describing the corrupted system file and system metadata describing the operating system;
    a matching module programmed to identify an uncorrupted version of the corrupted system file by:
        identifying a series of matching tests for matching the corrupted system file with the uncorrupted version, the series of matching tests comprising at least one file metadata item from the file metadata and at least one system metadata item from the system metadata;
        applying the series of matching tests in a predetermined order to a database of uncorrupted system files until a matching test matches the corrupted system file with the uncorrupted version of the system file;
    at least one hardware processor configured to execute the identification module, the receiving module, and the matching module.

10. The system of claim 9, further comprising a repair module programmed to repair the corrupted system file with the uncorrupted version of the system file, wherein the system file comprises a file that interfaces directly with a kernel of the operating system to contribute to operation of the operating system.

11. The system of claim 10, wherein the repair module is programmed to repair the corrupted system file with the uncorrupted version of the system file by:
identifying at least one difference between the corrupted system file and the uncorrupted system file;
replacing the difference in the corrupted system file with a corresponding portion of the uncorrupted system file.

12. The system of claim 9, wherein the receiving module is programmed to receive the file metadata by:
receiving the corrupted system file;
parsing a portable executable header of the corrupted system file for the file metadata.

13. The system of claim 9, wherein the series of matching tests comprises a matching test comparing the corrupted system file and each prospective match within the database of uncorrupted system files by comparing at least:
a checksum of the corrupted system file and a checksum of the prospective match;
an operating system version of the operating system and an operating system version of the prospective match;
a file name of the corrupted system file and a file name of the prospective match.

14. The system of claim 9, wherein the series of matching tests comprises a matching test comparing the corrupted system file and each prospective match within the database of uncorrupted system files by comparing at least:
a file architecture of the corrupted system file and a file architecture of the prospective match;
a file name of the corrupted system file and a file name of the prospective match.

15. The system of claim 9, wherein the series of matching tests comprises a matching test comparing the corrupted system file and each prospective match within the database of uncorrupted system files by comparing at least:
a product name of the corrupted system file and a product name of the prospective match;
a product version of the corrupted system file and a product version of the prospective match;
a file architecture of the corrupted system file and a file architecture of the prospective match;
a file name of the corrupted system file and a file name of the prospective match.

16. The system of claim 9, wherein the series of matching tests comprises a matching test comparing the corrupted system file and each prospective match within the database of uncorrupted system files by comparing at least:
an operating system version of the operating system and an operating system version of the prospective match;
a service pack of the operating system and a service pack of the operating system version of the prospective match;
a hotfix of the operating system and a hotfix of the operating system version of the prospective match;
an architecture of the operating system and an architecture of the operating system version of the prospective match;
a file name of the corrupted system file and a file name of the prospective match.

17. A non-transitory computer-readable-storage medium comprising one or more computer-executable instructions that, when executed by at least one processor of a computing device, cause the computing device to:
identify a request to repair a corrupted system file in an operating system;
receive file metadata describing the corrupted system file and system metadata describing the operating system;
identify an uncorrupted version of the corrupted system file by:
identifying a series of matching tests for matching the corrupted system file with the uncorrupted version, the series of matching tests comprising at least one file metadata item from the file metadata and at least one system metadata item from the system metadata;
applying the series of matching tests in a predetermined order to a database of uncorrupted system files until a matching test matches the corrupted system file with the uncorrupted version of the system file.

18. The computer-readable-storage medium of claim 17, wherein the one or more computer-executable instructions further cause the computing device to repair the corrupted system file with the uncorrupted version of the system file.

19. The computer-readable-storage medium of claim 18, wherein the one or more computer-executable instructions cause the computing device to repair the corrupted system file with the uncorrupted version of the system file by causing the computing device to:
identify at least one difference between the corrupted system file and the uncorrupted system file;
replace the difference in the corrupted system file with a corresponding portion of the uncorrupted system file.

20. The computer-readable-storage medium of claim 17, wherein the one or more computer-executable instructions cause the computing device to receive the file metadata by causing the computing device to:
receive the corrupted system file;
parse a portable executable header of the corrupted system file for the file metadata.

* * * * *